(12) United States Patent
Saito et al.

(10) Patent No.: US 6,451,906 B1
(45) Date of Patent: Sep. 17, 2002

(54) FLAME-RETARDANT RESIN COMPOSITION AND MOLDED ARTICLE CONSISTING OF THE SAME

(75) Inventors: Akihiro Saito, Utsunomiya; Takuro Kitamura; Hiromi Ishida, both of Moka; Yoshiaki Takezawa, Ohta; Yutaka Horie, Ohizumi-machi; Michio Zenbayashi, Omata-machi, all of (JP)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/717,745

(22) Filed: Nov. 21, 2000

(30) Foreign Application Priority Data

Nov. 26, 1999 (JP) .......................................... 11-336881

(51) Int. Cl.⁷ .............................................. C08L 83/04
(52) U.S. Cl. ...................... 524/588; 524/442; 524/500; 524/537; 524/464; 525/461; 525/462; 525/474
(58) Field of Search .................. 524/442, 588, 524/500, 537, 464; 525/461, 462, 474

(56) References Cited

U.S. PATENT DOCUMENTS

| | | | |
|---|---|---|---|
| 2,393,967 A | 2/1946 | Brubaker | 260/80 |
| 3,028,385 A | 4/1962 | Batzer et al | |
| 3,334,154 A | 8/1967 | Kim | |
| 4,001,124 A | 1/1977 | Hussey | |
| 4,001,184 A | 1/1977 | Scott | |
| 4,131,576 A | 12/1978 | Iovine et al. | |
| 4,238,569 A | 12/1980 | Lim et al. | |
| 4,238,597 A | 12/1980 | Markezich et al. | |
| 4,387,176 A | 6/1983 | Frye | |
| 4,444,930 A | * 4/1984 | Guerin et al. | |
| 4,474,999 A | 10/1984 | Mark et al. | |

FOREIGN PATENT DOCUMENTS

| | | |
|---|---|---|
| EP | 9 902 060 | 3/1999 |
| EP | 1 026 204 A | 8/2000 |
| JP | 51045160 | 7/1976 |
| JP | 54036365 | 3/1979 |
| JP | 56100853 | 8/1981 |
| JP | 87025706 | 6/1987 |
| JP | 87060421 | 12/1987 |
| JP | 1247456 | 10/1989 |
| JP | 2124934 | 5/1990 |
| JP | 2175723 | 7/1990 |
| JP | 2238046 | 9/1990 |
| JP | 91048947 | 7/1991 |
| JP | 3190958 | 8/1991 |
| JP | 4175368 | 6/1992 |
| JP | 4226150 | 8/1992 |
| JP | 4298554 | 10/1992 |
| JP | 5086295 | 4/1993 |
| JP | 6260421 | 9/1994 |
| JP | 6306265 | 11/1994 |
| JP | 6329894 | 11/1994 |
| JP | 6336547 | 12/1994 |
| JP | 8176425 | 7/1996 |
| JP | 8176427 | 7/1996 |
| JP | 08-176427 | 7/1996 |
| JP | 8225737 | 9/1996 |
| JP | 9169914 | 6/1997 |
| JP | 10139964 | 5/1998 |
| JP | 11140294 | 5/1999 |
| JP | 11140329 | 5/1999 |
| JP | 11217494 | 8/1999 |

OTHER PUBLICATIONS

Database WPI, Section Ch, Week 200103, Derwent Publications Ltd., London GB; Class A23, AN 2001–024680, XP002171155 & WO 00 64976 A (NEC Corp.), Nov. 2, 2000 abstract.

Database WPI, Section Ch, Week 200043, Derwent Publications, Ltd., London, GB; Class A23, AN 2000–490838, XP002171156 & WO 00 39217 A (Idemitsu Petrochem CO. LTD.), Jul. 6, 2000 abstract.

PCT International Search Report for International Application No. PCT/US 00/32279.

* cited by examiner

*Primary Examiner*—Robert Dawson
*Assistant Examiner*—Kuo-Liang Peng

(57) ABSTRACT

The object of the present invention is to provide a flame-retardant resin composition which has a high heat resistance, superior impact resistance and superior flame-retarding properties. The present invention provides a flame-retardant resin composition which is characterized by the fact that said composition contains (A) a polycarbonate type resin, (B) a silicone resin constructed from siloxane units expressed by the formula $RSiO_{1.5}$ (T units) and siloxane units expressed by the formula $R_3SiO_{0.5}$ (M units), or a silicone resin constructed from T units, M units and siloxane units expressed by the formula $SiO_{2.0}$ (Q units) (R indicates an unsubstituted or substituted monovalent hydrocarbon group with 1 to 10 carbon atoms), and (C) an anti-drip agent, and the aforementioned composition contains 0.1 to 9 parts by weight of the abovementioned silicone resin (B), and 0.01 to 10 parts by weight of the abovementioned anti-drip agent, per 100 parts by weight of the abovementioned polycarbonate resin (A).

7 Claims, No Drawings

FLAME-RETARDANT RESIN COMPOSITION AND MOLDED ARTICLE CONSISTING OF THE SAME

FIELD OF THE INVENTION

The present invention relates to a flame-retardant resin composition that contains a polycarbonate type resin. More specifically, the present invention relates to a flame-retardant resin composition that is useful in applications in which superior flame-retarding properties are required, e. g., housing materials and parts for household electrical appliances or OA equipment such as television sets, monitors, printers, copying machines, facsimile machines and personal computers, etc., battery packs, liquid crystal reflective panels, automotive materials and construction materials, etc.

BACKGROUND OF THE INVENTION

Polycarbonate resins are widely used in a broad range of fields including electrical devices, electronics and OA as engineering plastics that are superior in terms of transparency, impact resistance, heat resistance and electrical characteristics. In these fields of electrical devices, electronics and OA, superior flame-retarding properties (UL 94V) and impact resistance are required (as in the case of external parts of personal computers).

Polycarbonate resins are highly flame-retardant plastic materials that possess self-extinguishing properties; however, in order to satisfy further safety requirements in the fields of electrical devices, electronics and OA, there is a need for an even higher degree of flame-retarding properties corresponding to UL 94V-0 or 94V-1.

Conventionally, in order to improve the flame-retarding properties of polycarbonate resins, a method has been employed in which an oligomer or polymer of a carbonate derivative of brominated bisphenol A is added in large quantities to the polycarbonate. However, in cases where such oligomers or polymers of carbonate derivatives of brominated bisphenol A are added in large quantities as flame-retarding agents, although the flame-retarding properties of the polycarbonate resin are certainly improved, the impact resistance drops, and cracking occurs in molded articles that are molded from the resin. Furthermore, since a halogen type compound containing a large amount of bromine is added, there is a possibility that gases containing this halogen will be generated in the case of combustion. Accordingly, from an environmental standpoint as well, there is a demand for the use of flame-retarding agents that do not contain halogens such as chlorine or bromine, etc.

Phosphoric acid esters and silicone resins are known as flame-retarding agents that do not contain halogens. For example, in Japanese Examined Patent Application (Kokoku) No. Sho 62-25706, the addition of phosphoric acid esters for the purpose of improving the flame-retarding properties of polycarbonate type resins is proposed. However, in cases where phosphoric acid esters are added to polycarbonate type resins, the heat resistance and impact resistance drop when molded articles are manufactured.

On the other hand, in the case of silicone resins, the heat resistance is high, no harmful gases are generated during combustion, and silicone resins themselves are very safe; accordingly, such resins have come to be used as flame-retarding agents for polycarbonate type resins.

Silicone compounds used as flame-retarding agents are polymers that are formed by polymerizing at least some of the four types of siloxane units shown below (M units, D units, T units and Q units).

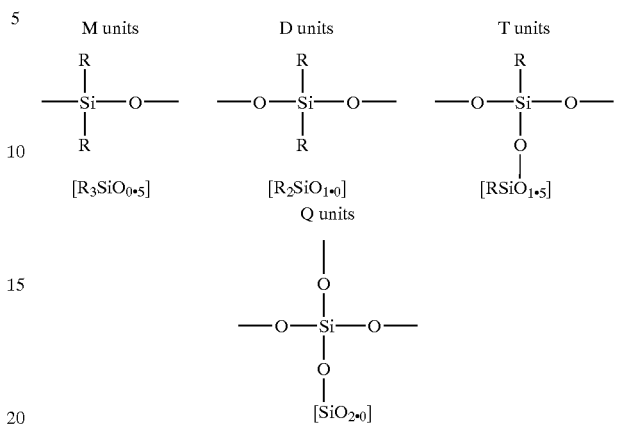

CHEMICAL FORMULA 1

For example, a flame-retardant resin composition formed by adding a silicone resin containing 80 wt % or more T units of a thermoplastic resin is disclosed in Japanese Examined Patent Application (Kokoku) No. Sho 62-60421. Furthermore, a flame-retardant resin composition formed by adding a silicone resin containing 30 to 99 mol % T units, 0 to 80 mol % D units, 1 to 70 mol % M units and 0 to 50 mol % Q units to a synthetic resin such as a polycarbonate, etc., is disclosed in Japanese Unexamined Patent Application (Kokai) No. Hei 5-86295.

However, the addition of the silicone resins described in the abovementioned patent applications alone rarely produces a large flame-retarding effect. Furthermore, in order to satisfy the strict flame-retardant standards involved in the case of electrical and electronic equipment, silicone resins must be added in large amounts; as a result, this may have a deleterious effect on the moldability, kneadability and other necessary characteristics of the plastic. In addition, this is also disadvantageous from the standpoint of cost, so that such methods are not practical.

Accordingly, methods have also been proposed in which silicone compounds and metal salts are used in combination in an attempt to improve the flame-retarding effect of the silicone compounds themselves, and also to reduce the amount of silicone compounds added. For example, a flame-retardant resin composition formed by adding silicones consisting of D units and group IIa metal salts of carboxylic acids with 14 to 20 carbon atoms to polymers such as polycarbonates, etc., is disclosed in Japanese Unexamined Patent Application (Kokai) No. Sho 56-100853, and a flame-retardant composition formed by mixing a silicone resin constructed from M units and Q units with other silicone resins and group IIa metal salts of carboxylic acids is disclosed in Japanese Examined Patent Application (Kokoku) No. Hei 3-48947. However, even if silicone compounds and metal salts are used in combination, the resulting effect is inferior from the standpoint of flame-retarding characteristics; accordingly, in order to obtain a sufficient flame-retarding effect, it is necessary to increase the amount of silicone resin used, or to use an inorganic flame-retardant filler such as aluminum hydroxide, etc., or a halogen or phosphorus compound, in combination.

Thus, in cases where silicone resins are added as flame-retarding agents, a sufficient flame-retarding effect cannot be obtained unless the amount added is large. Furthermore, if the amount added is increased, various properties of the resulting molded articles such as external appearance and mechanical strength, etc., show a great deterioration, and since silicone resins themselves are expensive, material costs are increased when such resins are added to polycarbonate type resins. Consequently, there has been a demand for the development of silicone resin additives with a greater flame-retarding effect, or additives that improve the [flame-retarding] effect when used in combination with silicone resins.

A flame-retardant resin composition which is formed by adding an organopolysiloxane containing epoxy groups and an alkali metal salt of an organic sulfonic acid is described in Japanese Unexamined Patent Application (Kokai) No. Hei 8-176425, and a flame-retardant resin composition formed by adding a polycarbonate modified by an organopolysiloxane containing phenolic hydroxy groups, and an organic alkali metal salt, is described in Japanese Unexamined Patent Application (Kokai) No. Hei 8-176427. Furthermore, a composition whose flame-retarding effect is improved by the use of petroleum type heavy oils or pitches in combination with silicone compounds is described in Japanese Unexamined Patent Application (Kokai) No. Hei 9-169914. In the case of these compositions, however, it is necessary to use expensive silicone resins of the types described in Japanese Unexamined Patent Application (Kokai) No. Hei 8-176425 and Japanese Unexamined Patent Application (Kokai) No. Hei 8-176427, and a flame-retarding effect sufficient to justify the increased cost that results from the complication of the manufacturing process is not obtained. Thus, further improvement is desired.

Furthermore, none of the abovementioned conventional silicone resins shows sufficient dispersibility or compatibility with polycarbonate resins.

Moreover, a flame-retardant resin composition formed by mixing a silicone resin which has a molecular weight (weight average molecular weight) in the range of 10,000 to 270,000, and which contains D units and T units expressed by the formula shown below, with an aromatic polycarbonate has been proposed in Japanese Unexamined Patent Application (Kokai) No. Hei 10-139964.

CHEMICAL FORMULA 2

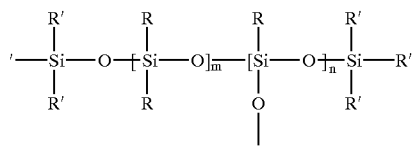

Furthermore, a flame-retardant polycarbonate resin composition in which a silicone resin that contains 50 to 90 mol % T units, 10 to 50 mol % D units and 80 mol % or more phenyl groups among the total organic substituent groups is mixed with an aromatic polycarbonate resin is proposed in Japanese Unexamined Patent Application (Kokai) No. Hei 11-140294.

However, in the case of the flame-retardant polycarbonate compositions described in Japanese Unexamined Patent Application (Kokai) No. Hei 10-139964 and Japanese Unexamined Patent Application (Kokai) No. Hei 11-140294, the combustion time is long and the drip characteristics are inadequate, so that the flame-retarding properties determined in a combustibility test based on UL 94, which has been widely evaluated in actual practice, were insufficient.

Furthermore, a flame-retardant polycarbonate resin composition which is formed by mixing [a] a silicone compound which has a structure expressed by the formula shown below, i. e., [i] which has D units as its principal constituent units, [ii] which is constructed from T units and/or Q units along with D units, and [iii] which has aromatic groups as organic functional groups, [b] a metal salt of an organosulfur compound, and [c] a fluorine-containing polymer, with a polycarbonate resin is disclosed in Japanese Unexamined Patent Application (Kokai) No. Hei 11-217494.

CHEMICAL FORMULA 3

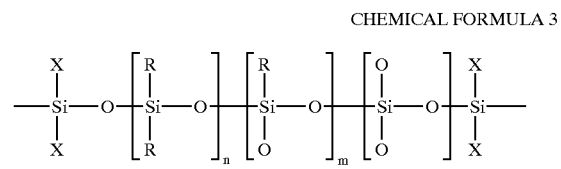

(In the above formula, R and X indicate organic functional groups.)

However, silicone resins which thus contain D units as an essential component have a conspicuously low softening point, and tend to be liquid at room temperature, so that the mixing of such silicone resins with polycarbonate resins is extremely difficult. Furthermore, by increasing the molecular weight, it is possible to obtain a silicone resin that is solid at room temperature even in the case of silicone resins that contain D units as an essential component; in such cases, however, the polymerization that is used to increase the molecular weight requires a long time, and even if such a silicone resin is added, the flame-retarding effect is small.

Thus, in the case of flame-retardant resin compositions proposed in the past, compositions that are satisfactory in terms of flame-retarding properties and fluidity, and in terms of the characteristics of the molded articles obtained, such as heat resistance and impact resistance, etc., have not always been obtained.

The present inventors conducted diligent research in order to solve the abovementioned problems. As a result of this research, the inventors discovered that a resin composition which has a high level of flame-retarding properties, and which solves all of the abovementioned problems, can be obtained by using a silicone resin that is substantially free of D units, and that is constructed from T units and M units, or from T units, Q units and M units, as a flame-retarding agent, and mixing this silicone resin with a polycarbonate type resin in combination with an anti-drip agent. This discovery led to the perfection of the present invention of a flame-retardant resin composition that has a high heat resistance, superior impact resistance and superior flame-retarding properties.

BRIEF SUMMARY OF THE INVENTION

The flame-retardant resin composition of the present invention is characterized by the fact that said composition contains (A) a polycarbonate type resin, (B) a silicone resin constructed from T units and M units or a silicone resin constructed from T units, M units and Q units, and (C) an anti-drip agent, and the aforementioned composition contains 0.1 to 9 parts by weight of the aforementioned silicone resin (B) constructed from T units and M units or silicone resin (B) constructed from T units, M units and Q units, and 0.01 to 10 parts by weight of the aforementioned anti-drip agent (C), per 100 parts by weight of the aforementioned polycarbonate type resin (A).

It is desirable that the aforementioned anti-drip agent be a polytetrafluoroethylene (PTFE); furthermore, it is desirable that the composition contain 0.01 to 2 parts by weight of this polytetrafluoroethylene per 100 parts by weight of the aforementioned polycarbonate type resin (A).

The electrical or electronic equipment parts of the present invention are molded from the aforementioned flame-retardant resin composition. Furthermore, the housing material of the present invention is molded from the aforementioned flame-retardant resin composition.

DETAILED DESCRIPTION OF THE INVENTION

The flame-retardant resin composition of the present invention will be described below.

The flame-retardant resin composition of the present invention is characterized by the fact that said composition contains (A) a polycarbonate type resin, (B) a silicone resin constructed from T units and M units or a silicone resin constructed from T units, M units and Q units, and (C) an anti-drip agent.

Polycarbonate Type Resin (A)

The polycarbonate type resin (A) of the present invention is an aromatic homopolycarbonate or aromatic copolycarbonate that is obtained by reacting an aromatic dihydroxy compound and a carbonate precursor.

Carbonate resins generally contain repeating structural units expressed by the following formula (1):

Chemical Formula 4

  (1)

(In the above formula, A indicates a divalent residue derived from an aromatic dihydroxy compound.) Examples of aromatic dihydroxy compounds that can be used include mononuclear or polynuclear aromatic compounds which contain two hydroxy groups constituting functional groups, and in which the respective hydroxy groups are directly bonded to the carbon atoms of the aromatic nuclei.

Concrete examples of such aromatic dihydroxy compounds include the bisphenol compounds expressed by the following formula (2):

CHEMICAL FORMULA 5

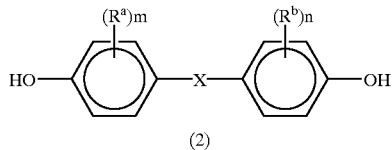

(2)

(In the above formula, $R^a$ and $R^b$ indicate halogen atoms or monovalent hydrocarbon groups; these groups may be the same or different, n and n are integers from 0 to 4, X indicates

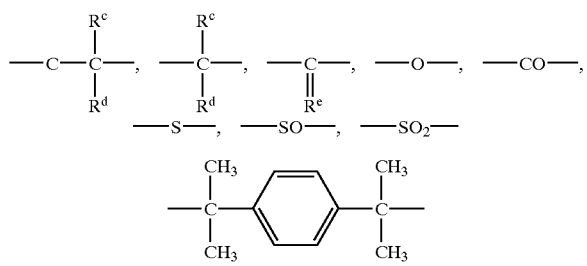

$R^c$ and $R^d$ indicate hydrogen atoms or monovalent hydrocarbon groups; furthermore, $R^c$ and $R^d$ may form a ring structure, and $R^e$ is a divalent hydrocarbon group.)

Concrete examples of aromatic dihydroxy compounds expressed by formula (2) include bis(hydroxyaryl)alkanes such as bis(4-hydroxyphenyl)methane, 1,1-bis(4-hydroxyphenyl)ethane, 2,2-bis(4-hydroxyphenyl)propane (so-called bisphenol A), 2,2-bis(4-hydroxyphenyl)butane, 2,2-bis(4-hydroxyphenyl)octane, bis(4-hydroxyphenyl)phenylmethane, 2,2-bis(4-hydroxyphenyl-1-methylphenyl)propane, 1,1-bis(4-hydroxyphenyl-t-butylphenyl)propane, 2,2-bis(4-hydroxy-3-bromophenyl)propane, and 2,2-(4-hydroxy-3,5-dibromophenyl)propane, etc.; bis(hydroxyaryl)cycloalkanes such as 1,1-bis(4-hydroxyphenyl)cyclopentane and 1,1-(4-hydroxyphenyl)cyclohexane, etc.; dihydroxyaryl ethers such as 4,4'-dihydroxydiphenyl ether and 4,4'-dihydroxy-3,3-dimethylphenyl ether, etc.; dihydroxydiaryl sulfides such as 4,4'-dihydroxydiphenyl sulfide and 4,4'-dihydroxy-3,3'-dimethylphenyl sulfide, etc., dihydroxydiaryl sulfoxides such as 4,4'-dihydroxydiphenyl sulfoxide and 4,4'-dihydroxy-3,3'-dimethyldiphenyl sulfoxide, etc.; and dihydroxydiarylsulfones such as 4,4'-dihydroxydiphenylsulfone and 4,4'-dihydroxy-3,3'-dimethyldiphenylsulfone, etc. However, the present invention is not limited to such compounds.

Among the abovementioned aromatic dihydroxy compounds, 2,2-bis(4-hydroxyphenyl)propane (bisphenol A) is especially desirable for use.

Furthermore, in regard to aromatic dihydroxy compounds other than those expressed by the abovementioned formula (2), aromatic dihydroxy compounds expressed by the following formula (3) may also be used.

CHEMICAL FORMULA 6

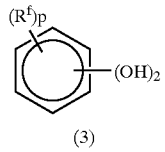

(3)

(Here, the $R_f$ groups are respectively independent, and indicate hydrocarbon groups with 1 to 10 carbon atoms, halogenated hydrocarbon groups formed by substituting one or more of the aforementioned hydrocarbon groups with halogen atoms, or halogen atoms, and p is an integer from 0 to 4.)

Examples of such compounds include resorcin; substituted resorcins such as 3-methylresorcin, 3-ethylresorcin, 3-propylresorcin, 3-butylresorcin, 3-t-butylresorcin, 3-phenylresorcin, 3-cumylresorcin, 2,3,4,6-tetrafluororesorcin and 2,3,4,6-tetrabromoresorcin, etc.; catechol; hydroquinone; and substituted hydroquinones such as 3-methylhydroquinone, 3-ethylhydroquinone, 3-propylhydroquinone, 3-butylhydroquinone, 3-t-butylhydroquinone, 3-phenylhydroquinone, 3-cumylhydroquinone, 2,3,5,6-tetramethylhydroquinone, 2,3,5,6-tetra-t-butylhydroquinone, 2,3,5,6-tetrafluorohydroquinone and 2,3,5,6-tetrabromohydroquinone, etc.; as well as 2,2,2',2'-tetrahydro-3,3,3',3'-tetramethyl-1,1'-spirobi-[1H-indene]-7,7'-diol expressed by the following formula

CHEMICAL FORMULA 7

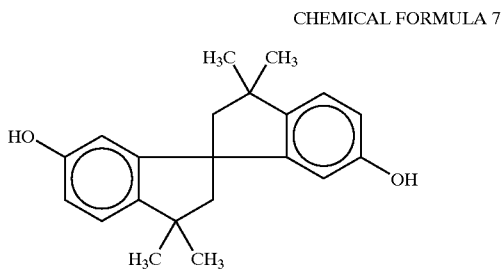

Such aromatic dihydroxy compounds may be used singly or in combinations consisting of two or more compounds.

Furthermore, the polycarbonate used may be a linear polycarbonate or a branched polycarbonate. Moreover, a blend of a linear polycarbonate and branched polycarbonate may also be used.

Such branched polycarbonates can be obtained by reacting a multifunctional aromatic compound with an aromatic dihydroxy compound and a carbonate precursor. Typical examples of such multifunctional aromatic compounds are described in U.S. Pat. Nos. 3,028,385, 3,334,154, 4,001,124 and 4,131,576. Concrete examples of such compounds include 1,1,1-tris(4-hydroxyphenyl)ethane, 2,2',2"-tris(4-hydroxyphenyl)diisopropylbenzene, α-methyl-α, α',α'-tris(4-hydroxyphenyl)-1,4-diethylbenzene, α,α', α"-tris(4hydroxyphenyl)-1,3,5-triisopropylbenzene, fluoroglycine, 4,6-dimethyl-2,4,6-tri(4-hydroxyphenyl)-heptane-2,1,3,5-tri(4-hydroxyphenyl)benzene, 2,2-bis-[4,4-(4,4'-dihydroxyphenyl)-cyclohexyl]-propane, trimellitic acid, 1,3,5-benzenetricarboxylic acid and pyromellitic acid, etc. Among these compounds, 1,1,1-tris(4-hydroxyphenyl) ethane and α,α',α"-tris(4-hydroxyphenyl)-1,3,5-triisopropylbenzene are especially desirable for use.

There are no particular restrictions on the intrinsic viscosity of the abovementioned polycarbonate type resins as measured at 25° C. in methylene chloride; this viscosity may be appropriately selected in accordance with the intended use, and with moldability taken into account. Ordinarily, however, the viscosity is 0.26 dl/g or greater, preferably 0.30 dl/g to 0.98 dl/g, and even more preferably 0.34 dl/g to 0.64 dl/g. In cases where this is calculated as the viscosity average molecular weight, the value is ordinarily 10,000 or greater, preferably 12,000 to 50,000, and even more preferably 14,000 to 30,000. Furthermore, a mixture of a plurality of polycarbonate resins with different intrinsic viscosities may also be used.

The polycarbonate type resin used in the present invention can be manufactured by a universally known method. Examples of methods that can be used include the following:

(1) A method in which a polycarbonate is synthesized by causing an aromatic dihydroxy compound and a carbonate precursor (e.g., a carbonic acid diester) to undergo an ester interchange reaction in a molten state (melt method).

(2) A method in which an aromatic dihydroxy compound and a carbonate precursor (e.g., phosgene) are reacted in a solution (interfacial method).

Such manufacturing methods are described (for example) in Japanese Unexamined Patent Application (Kokai) No. Hei 2-175723, Japanese Unexamined Patent Application (Kokai) No. Hei 2-124934, the specification of U.S. Pat. No. 4,001,184, the specification of U.S. Pat. No. 4,238,569, the specification of U.S. Pat. No. 4,238,597 and the specification of U.S. Pat. No. 4,474,999, etc.

Melt Method

Examples of carbonic acid diesters that can be used in method (1) (melt method) include diphenyl carbonate, bis(chlorophenyl) carbonate, bis(2,4-dichlorophenyl carbonate), bis(2,4,6-trichlorophenyl) carbonate, bis(2-cyanophenyl) carbonate, bis(o-nitrophenyl) carbonate, ditolyl carbonate, m-cresyl carbonate, dinaphthyl carbonate, bis(diphenyl) carbonate, diethyl carbonate, dimethyl carbonate, dibutyl carbonate and dicyclohexyl carbonate, etc. Among these compounds, diphenyl carbonate is especially desirable for use. Furthermore, such carbonic acid diesters may also contain dicarboxylic acids or dicarboxylic acid esters. More concretely, these carbonic acid diesters may contain dicarboxylic acids or dicarboxylic acid esters preferably at the rate of 50 mol % or less, and even more preferably at the rate of 30 mol % or less.

Examples of such dicarboxylic acids or dicarboxylic acid esters include terephthalic acid, isophthalic acid, sebacic acid, decanedioic acid, dodecanedioic acid, diphenyl sebacate, diphenyl terephthalate, diphenyl isophthalate, diphenyl decanedioate and diphenyl dodecanedioate, etc. The abovementioned carbonic acid diesters may also contain two or more of these dicarboxylic acids or dicarboxylic acid esters.

When such carbonic acid diesters are subjected to polycondensation with the aforementioned aromatic dihydroxy compounds, polycarbonates are obtained. In the manufacture of polycarbonates, it is desirable that the abovementioned carbonic acid diesters be used at the rate of 0.95 to 1.30 moles, preferably 1.01 to 1.20 moles, per mole of the total amount of aromatic dihydroxy compound(s) used.

In such a melt method, the compounds proposed by the present applicant in Japanese Unexamined Patent Application (Kokai) No. Hei 4-175368 (for example) can be used as catalysts.

In concrete terms, (a) alkali metal compounds and/or alkaline earth metal compounds (hereafter referred to in some cases as "(a) alkali (earth) metal compounds") are ordinarily used as melt polycondensation catalysts.

Desirable examples of (a) alkali (earth) metal compounds include organic acid salts, inorganic acid salts, oxides, hydroxides, hydrides and alcoholates, etc., of alkali metals and alkaline earth metals.

Concrete examples of alkali metal compounds include sodium hydroxide, potassium hydroxide, lithium hydroxide, sodium hydrogencarbonate, potassium hydrogencarbonate, lithium hydrogencarbonate, sodium carbonate, potassium carbonate, lithium carbonate, sodium acetate, potassium acetate, lithium acetate, sodium stearate, potassium stearate, lithium stearate, sodium borohydride, lithium borohydride, phenylated sodium boride, sodium benzoate, potassium benzoate, lithium benzoate, disodium hydrogenphosphate, dipotassium hydrogenphosphate, dilithium hydrogenphosphate, disodium salts, dipotassium salts and dilithium salts of bisphenol A, and sodium salts, potassium salts and lithium salts of phenols, etc.

Examples of alkaline earth metal compounds include calcium hydroxide, barium hydroxide, magnesium hydroxide, strontium hydroxide, calcium hydrogencarbonate, barium hydrogencarbonate, magnesium hydrogencarbonate, strontium hydrogencarbonate, calcium carbonate, barium carbonate, magnesium carbonate, strontium carbonate, calcium acetate, barium acetate, magnesium acetate, strontium acetate, calcium stearate, barium stearate, magnesium stearate and strontium stearate, etc. Two or more of these compounds may also be used in combination.

It is desirable that such alkali (earth) metal compounds be included in the melt polycondensation reaction at the rate of $1\times10^{-8}$ to $1\times10^{-3}$ moles, preferably $1\times10^{-7}$ to $2\times10^{-6}$ moles, and even more preferably $1\times10^{-7}$ to $8\times10^{-7}$ moles, per mole of bisphenols. Furthermore, in cases where alkali (earth) metal compounds are added beforehand to the bisphenols constituting the raw materials of the melt polycondensation reaction, it is desirable to control the amounts added so that the quantities of alkali (earth) metal compounds present during the melt polycondensation reaction are with the abovementioned ranges relative to one mole of the bisphenols.

Furthermore, (b) basic compounds may also be used in combination with the above mentioned (a) alkali (earth) metal compounds as melt polycondensation catalysts.

Examples of such basic compounds (b) include basic compounds that break down easily at high temperatures, or volatile nitrogen-containing basic compounds. The compounds shown below may be cited as concrete examples.

Ammonium hydroxides that have alkyl or aryl groups such as tetramethylammonium hydroxide ($Me_4NOH$), tetraethylammonium hydroxide ($Et_4NOH$), tetrabutylammonium hydroxide ($Bu_4NOH$) and trimethylbenzylammonium hydroxide ($\phi$—$CH_2(Me)_3NOH$), etc., tertiary amines such as trimethylamine, triethylamine, dimethylbenzylamine and triphenylamine, etc., secondary amines expressed by the formula $R_2NH$ (in the formula, R indicates an alkyl group such as a methyl or ethyl group, etc., or an aryl group such as a phenyl or tolyl group, etc.), primary amines expressed by the formula $RNH_2$ (in the formula, R has the same meaning as described above), pyridines such as 4-dimethylaminopyridine, 4-diethylaminopyridine and 4-pyrrolidinopyridine, etc., imidazoles such as 2-methylimidazole and 2-phenylimidazole, etc., and basic salts such as ammonia, tetramethylammonium borohydride ($Me_4NBH_4$), tetrabutylammonium borohydride ($Bu_4NBH_4$), tetrabutylammonium tetraphenylborate ($Bu_4NBPh_4$) and tetramethylammonium tetraphenylborate ($Me_4NBPh_4$), etc.

Among these compounds, tetraalkylammonium hydroxides are especially desirable for use.

The abovementioned nitrogen-containing basic compounds can be used at the rate of $1\times10^{-6}$ to $1\times10^{-1}$ moles, and preferably $1\times10^{-5}$ to $1\times10^{-2}$ moles, per mole of bisphenols.

Furthermore, a boric acid compound (c) can be used as a catalyst.

Examples of such boric acid compounds (c) include boric acid and boric acid esters.

Examples of boric acid esters that can be used include boric acid esters expressed by the following general formula:

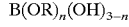

In the above formula, R indicates an alkyl group such as a methyl or ethyl group, etc., or an aryl group such as a phenyl group, etc., and n is 1,2 or 3.

Concrete examples of such boric acid esters include trimethyl borate, triethyl borate, tributyl borate, trihexyl borate, triheptyl borate, triphenyl borate, tritolyl borate and trinaphthyl borate, etc.

Such boric acid or boric acid esters (c) can be used at the rate of $1\times10^{-8}$ to $1\times10^{-1}$ moles, preferably $1\times10^{-7}$ to $1\times10^{-2}$ moles, and even more preferably $1\times10^{-6}$ to $1\times10^{-4}$ moles, per mole of bisphenols.

In regard to the melt polycondensation catalyst used, it is desirable to combine (for example) an alkali (earth) metal compound (a) and a nitrogen-containing basic compound (b), or to combine an alkali (earth) metal compound (a), a nitrogen-containing basic compound (b) and boric acid or a boric acid ester (c).

When the abovementioned amounts of an alkali (earth) metal compound (a) and a nitrogen-containing basic compound (b) are used in combination as a catalyst, the polycondensation reaction can be caused to proceed at a sufficient rate, and a polycarbonate with a high molecular weight can be produced at a high polymerization activity. Accordingly, such a combination is desirable.

Furthermore, in cases where the abovementioned alkali (earth) metal compound (a) and nitrogen-containing basic compound (b) are used in combination, or in cases where the abovementioned alkali (earth) metal compound (a), nitrogen-containing basic compound (b) and boric acid or boric acid ester (c) are used in combination, a mixture of the respective catalyst components may be added to the molten mixture of bisphenol and carbonic acid diester, or the components may be added separately to the molten mixture of bisphenol and carbonic acid diester.

Interfacial Method

Examples of carbonate precursors that can be used in the interfacial method (2) include carbonyl halides, diaryl carbonates and bishaloformates. Any of these compounds may be used. Examples of carbonyl halides that can be used include carbonyl bromide, carbonyl chloride (so-called phosgene) and mixtures of both.

Examples of aryl carbonates that can be used include diphenyl carbonate, ditolyl carbonate, bis(chlorophenyl) carbonate, m-cresyl carbonate, dinaphthyl carbonate and bis(diphenyl) carbonate, etc. Furthermore, examples of bishaloformates that can be used include bischloroformates or bisbromoformates of aromatic dihydroxy compounds such as 2,2-bis(4-hydroxyphenyl)propane, 2,2-bis(4-hydroxy-3,5-dichlorophenyl)propane or hydroquinone, etc., and bischloroformates or bisbromoformates of glycols such as ethylene glycol, etc. All of the abovementioned carbonate precursors are useful; however, carbonyl chloride (i. e., phosgene) is especially desirable.]

In this interfacial method, the aforementioned aromatic dihydroxy compound is first dissolved or dispersed in an aqueous solution of a caustic alkali. A solvent that is incompatible with water is added to the mixture thus obtained; then, these reaction substances are caused to contact a carbonate precursor such as phosgene at a specified pH in the presence of an appropriate catalyst. Ordinarily, the solvent incompatible with water that is used is methylene chloride, 1,2-dichloroethane, chlorobenzene or toluene, etc. There are no particular restrictions on catalysts that can be used in the interfacial method; ordinarily, tertiary amines such as triethylamine, etc., quaternary phosphonium compounds or quaternary ammonium compounds, etc., are used. There are no particular restrictions on the reaction temperature used in the interfacial method, as long as the temperature used is a temperature at which the reaction will proceed. However, a temperature in the range of room temperature (25° C.) to 50° C. is desirable.

If necessary, the ends of the polycarbonates obtained by the abovementioned manufacturing methods (1) and (2) may be closed by specified functional groups.

There are no particular restrictions on terminal closing agents that can be used; examples of such agents include monovalent phenols such as phenol, coumarone-I and p-cumylphenol, etc.

Silicone Resin (B)

The silicone resin constituting component (B) in the present invention is a silicone resin constructed from

[RSiO$_{1.5}$] T units and [R$_3$SiO$_{0.5}$] M units shown below, or a silicone resin constructed from [RSiO$_{1.5}$] T units, [R$_3$SiO$_{0.5}$] M units and [SiO$_2$] Q units.

CHEMICAL FORMULA 8

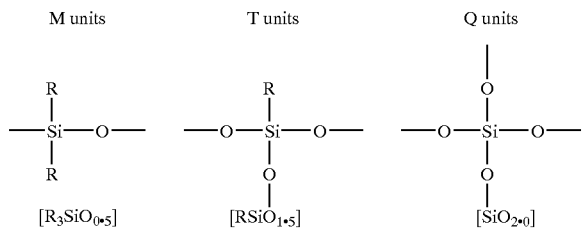

The organic groups R making up the silicone resins may be the same or different; concrete examples of such groups include alkyl groups such as methyl groups, ethyl groups, propyl groups and butyl groups, etc.; alkenyl groups such as vinyl groups and allyl groups, etc.; and aryl groups such as phenyl groups and tolyl groups, etc.

Among silicone resins with such organic groups R, silicone resins with methyl groups and/or phenyl groups as the organic groups R are especially desirable, since such resins are easy to obtain and show good flame-retarding properties and dispersibility in polycarbonate type resins. In particular, silicone resins with phenyl groups are not only superior in terms of flame-retarding properties, but also show superior compatibility with polycarbonates and improve the transparency of polycarbonates. It is desirable that such phenyl groups constitute 20 mol % or more of the total organic groups in the silicone resin, and a phenyl group content of 40 mol % or greater is even more desirable.

It is desirable that the M units in the silicone resin be contained in the resin at the rate of 0.03 to 1 mole, and preferably 0.05 to 0.3 moles, per mole of T units. Furthermore, in cases where Q units are contained in the silicone resin, it is desirable that these Q units be contained in the resin at the rate of 0.001 to 0.5 moles, and preferably 0.01 to 0.05 moles, per mole of T units. From the standpoint of flame-retarding properties, a higher content of Q units with a high degree of oxidation is advantageous; however, if Q units are numerous in the siloxanes, the fine inorganic particulate nature of the substance becomes too strong, so that dispersibility in the polycarbonate type resin is unsatisfactory; accordingly, it is necessary to keep the content [of Q units] within the abovementioned range.

Considering the balance of flame-retarding properties, workability and performance of molded articles, etc., from the standpoint of the abovementioned siloxane unit content ranges, it is further desirable to select [content] regions which are such that T units account of 50 to 97 mol % of the silicone resin.

Such silicone resins can be synthesized by universally known methods; for example, such resins can be obtained by subjecting organochlorosilanes or organoalkoxysilanes, etc., to a hydrolysis/condensation reaction in an excess of water. In concrete terms, if silane compounds that form the RSiO$_{1.5}$ units (T units) and SiO$_2$ units (Q units) are first subjected to a hydrolysis/condensation reaction in water so that a silicone resin containing silanol groups is produced, and a silicone resin is then produced by triorganosilylating these silanol groups, the molecular weight can easily be controlled. Accordingly, such a method is desirable.

In concrete terms, in regard to the method used to manufacture such silicone resins, such resins can be obtained by reacting 5 to 100 parts by weight of (b) a silicone compound expressed by the formula $(R^1_3Si)_aZ$ (in the formula, $R^1$ indicates substituted or unsubstituted monovalent hydrocarbon groups which may be the same or different, a is an integer from 1 to 3, Z indicates a hydrogen atom, halogen atom, hydroxy group or hydrolyzable group when a is 1, —O—, —NX— or Chemical Formula 9

—S— when a is 2, and —N— when a is 3, and

X indicates a hydrogen atom or a monovalent hydrocarbon group with 1 to 4 carbon atoms) with 100 parts by weight of (a) a silicone resin containing silanol groups consisting of [RSiO$_{1.5}$] T units.

The silanol-group-containing silicone resin of component (a) can be synthesized by universally known methods; for example, such a silicone resin can be obtained by subjecting an organochlorosilane or organoalkoxysilane, etc., to a hydrolysis/condensation reaction in an excess of water. In such a reaction, silicone resins with various degrees of polymerization can be obtained by adjusting the amount of water used, the type and amount of hydrolysis catalyst used, and the time and temperature of the condensation reaction, etc. The silicone resins thus obtained generally contain silanol groups (—SiOH).

The silicone compound of component (b) expressed by the formula $(R^1_3Si)_aZ$ silylates the silanol groups contained in component (a). Examples of hydrolyzable groups expressed by Z in this formula include alkoxyl groups such as methoxyl groups, ethoxyl groups, propoxyl groups, isopropoxyl groups and butoxyl groups, etc., halogen atoms such as chorine and bromine, etc., alkenyloxy groups such as propenoxy groups, etc., acyloxy groups such as acetoxy groups and benzoxy groups, etc., organooxime groups such as acetone oxime groups and butanoneoxime groups, etc., organoaminoxy groups such as dimethylaminoxy groups and diethylaminoxy groups, etc., organoamino groups such as dimethylamino groups, diethylamino groups and cyclohexylamino groups, etc., and organoamido groups such as N-methylacetamido groups, etc.

Concrete examples of component (b) include hydridosilanes such as triethylsilane, etc., chlorosilanes such as trimethylchlorosilane, triethylchlorosilane [and] triphenylchlorosilane, etc., silanols such as trimethylsilanol, etc., alkoxysilanes such as trimethylmethoxysilane and trimethylethoxysilane, etc., aminosilanes such as (CH$_3$)$_3$SiNHCH$_3$, (CH$_3$)$_3$SiNHC$_2$H$_5$, (CH$_3$)$_3$SiNH(CH$_3$)$_2$ and (CH$_3$)$_3$SiSiNH(C$_2$H$_5$)$_2$, etc., acyloxysilanes such as (CH$_3$)$_3$SiSiOCOCH$_3$, etc., disilazanes such as hexamethyldisilazane [(CH$_3$)$_2$Si]$_2$NH and 1,3-divinyltetramethyldisilazane, etc., and trisilazanes such as nonamethyltrisilazane, etc. Among these compounds, silazanes and chlorosilanes are especially desirable for use, since control of the reaction and removal of unreacted matter are easy in the case of such compounds.

The reaction of the abovementioned component (a) and component (b) can be performed under universally known conditions for the silylation of silanols. For example, in cases where component (b) is a silazane or chlorosilane, the reaction can easily be caused to proceed merely by mixing and heating component (a) and component (b). In this case, it is desirable that the amount of component (b) that is used be in the range of 5 to 100 parts by weight per 100 parts by weight of component (a). Furthermore, in cases where the amount of component (b) that is used is less than 5 parts by weight, the silanol groups of component (a) cannot be sufficiently silylated, so that problems such as gelation during the reaction, etc., may occur. On the other hand, in cases where the amount of component (b) that is used exceeds 100 parts by weight, an excess of unreacted component (b) remains. This results in poor economy in terms of raw materials; furthermore, considerable time is required in order to remove the unreacted component (b). As a result, the process becomes complicated.

Furthermore, it is desirable that the abovementioned silylation reaction be performed in an organic solvent in order to control the reaction temperature, and in order to suppress the occurrence of a dehydration-condensation reaction as a side reaction. Examples of organic solvents that can be used include hydrocarbon type solvents such as toluene, xylene, hexane, industrial gasoline, mineral spirit and kerosene, etc., ether type solvents such as tetrahydrofuran and dioxane, etc., and halogenated hydrocarbon type solvents such as dichloromethane and dichloroethane, etc. There are no particular restrictions on the reaction temperature; however, a temperature in the range of room temperature to 120° C. is suitable. The hydrochloric acid, ammonia, ammonium chloride and alcohol, etc., produced by the reaction can be removed by means of washing with water, or can be distilled away at the same time that the solvent is distilled away.

It is desirable that the silicone resin that is mixed with the polycarbonate type resin be a solid resin, since such a resin can be uniformly dispersed in the polycarbonate type resin. In particular, a solid silicone resin with a softening point of 40° C. or higher, preferably 70 to 250° C., is ideal for use. Furthermore, the softening point of the silicone resin used may also be adjusted by mixing two or more silicone resins with different softening points.

It is desirable that the molecular weight of the silicone resin used in the flame-retardant resin composition of the present invention be in the range of 1000 to 50,000. This molecular weight is preferably 2000 to 20,000, and a molecular weight of 3000 to 10,000 is especially desirable. In cases where the molecular weight is less than 1000, it is difficult to maintain a solid state under the conditions of use, so that the workability of the composition deteriorates. On the other hand, in cases where the molecular weight exceeds 50,000, the dispersibility of the resin in the polycarbonate may deteriorate.

Furthermore, the abovementioned molecular weight can be controlled by selecting the molecular weight of the silanol-group-containing silicone resin of component (a), the type of silanol groups silylated, or the type of component (b) that constitutes the silylating agent.

The silicone resin used in the present invention contains substantially no bifunctional siloxane units (D units) expressed by the formula $R_2SiO_{1.0}$. If the resin contains D units, the softening point drops conspicuously so that the resin becomes liquid at room temperature, thus making it difficult to mix the resin with the abovementioned polycarbonate. Furthermore, if the molecular weight is increased, then a silicone resin that is solid at room temperature can be obtained even in the case of a silicone resin containing D units; however, the polymerization time required in order to achieve such a high molecular weight is long, and the flame-retarding effect is low compared to silicone resins constructed from T units and M units or silicone resins constructed from T units, M units and Q units.

The silicone resin that is used may contain small quantities of silanol groups and alkoxy groups; however, from the standpoints of storage stability, stability during melt working and flame-retarding properties, it is desirable that the quantity of silanol groups in the resin be small. Specifically, it is desirable that silanol groups be contained in the silicone resin at the rate of 0.5 wt % or less, and a silanol group content of 0.3 wt % or less is even more desirable. Furthermore, crosslinkable functional groups such as alkoxy groups, etc., are not absolutely necessary in the silicone resin, and it is desirable that the quantity of alkoxy groups contained in the silicone resin be 5 wt % or less.

The amount of silicone resin that is mixed with the flame-retardant resin composition of the present invention is 0.1 to 9 parts by weight, preferably 0.3 to 6 parts by weight, per 100 parts by weight of polycarbonate type resin. In cases where the silicone resin content is less than 0.1 parts by weight, the composition cannot be endowed with sufficient flame-retarding properties. On the other hand, even if the silicone resin content exceeds 9 parts by weight, there is no sign of a further improvement in the flame-retarding properties; moreover, such a large content may have a detrimental effect on the external appearance, optical transparency and strength of articles molded from the composition. Furthermore, none of the abovementioned silicone resins generates any harmful gases during combustion.

Anti-Drip Agent (C)

The anti-drip agent used in the present invention is an agent that acts to suppress dripping during combustion. A universally known agent may be used. In particular, agents that form a fibril structure in polycarbonate type resins, such as polytetrafluoroethylenes (PTFE), etc., are highly effective in suppressing dripping, and are therefore desirable.

Among such polytetrafluoroethylenes (PTFE), preparations with superior dispersibility, e. g., preparations in which a PTFE is emulsified and dispersed in a solution of water, etc., or preparations in which a PTFE is subjected to an encapsulation treatment using a resins such as a polycarbonate or styrene-acrylonitrile copolymer, endow molded articles consisting of the polycarbonate composition with a good surface appearance, and are therefore desirable.

In cases where a preparation in which a PTFE is emulsified and dispersed in a solution of water, etc., is used, there are no particular restrictions on the preparation used; however, a preparation in which the PTFE has a mean particle size of 1 micron or less is desirable, and a mean particle size of 0.5 microns or less is especially desirable.

Concrete examples of preparations that are commercially marketed as such PTFE preparations include Teflon 30J (trademark, manufactured by Mitsui Du Pont Fluorochemical K.K.), Polyflon D-2C (trademark, manufactured by Daikin Kagaku Kogyo K.K.) and Aflon AD1 (trademark, manufactured by Asahi Glass K.K.), etc.

The anti-drip agent is added at the rate of 0.01 to 10 parts by weight, preferably 0.05 to 2 parts by weight, and even more preferably 0.1 to 0.5 parts by weight, per 100 parts by weight of polycarbonate type resin.

If the amount of component (C) that is added is less than the lower limit of the abovementioned range, a polycarbonate resin composition with superior flame-retarding properties cannot be obtained. On the other hand, if the amount added exceeds the upper limit of the abovementioned range, the fluidity of the composition may be lost.

Furthermore, such polytetrafluoroethylenes can also be manufactured by a universally known method (see the specification of U.S. Pat. No. 2,393,967). In concrete terms, such polytetrafluoroethylenes can be obtained as white solids by polymerizing tetrafluoroethylene in an aqueous solvent at a pressure of 100 to 1000 psi and a temperature of 0 to 200° C., preferably 20 to 100° C., using sodium, potassium or ammonium peroxydisulfate as a catalyst.

Such polytetrafluoroethylenes have a molecular weight of 500,000 or greater, and preferably have a molecular weight of 1,000,000 to 50,000,000.

As a result, dripping during combustion is suppressed in the case of a resin composition containing a polytetrafluoroethylene. Furthermore, if a polytetrafluoroethylene and a silicone resin are used in combination, dripping can be suppressed to an even greater extent than it can in cases where only a polytetrafluoroethylene is used; moreover, the combustion time can also be shortened.

In the present invention, polyphenylene ethers (PPE) may be used in combination with the abovementioned polytetrafluoroethylenes as anti-drip agents.

Polyphenylene ether type resins are themselves universally known, and are homopolymers and/or copolymers consisting of units expressed by the following formula (I):

CHEMICAL FORMULA 10

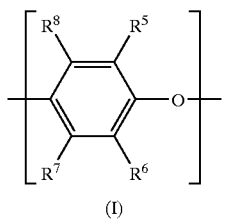

(I)

(In the above formula, $R^5$, $R^6$, $R^7$ and $R^8$ each independently indicate a hydrogen atom, a halogen atom, a hydrocarbon group or a substituted hydrocarbon group (e. g., a halogenated hydrocarbon group).

Concrete examples of such PPE include poly(2,y-dimethyl-1,4-phenylene) ethers, poly(2,6-diethyl-1,4-phenylene) ethers, poly(2-methyl-6-ethyl-1,4-phenylene) ethers, poly(2-methyl-6-propyl-1,4-phenylene) ethers, poly(2,6-dipropyl-1,4-phenylene) ethers, poly(2-ethyl-6-propyl-1,4-phenylene) ethers, poly(2,6-dimethoxy-1,4-phenylene) ethers, poly(2,6-dichloromethyl-1,4-phenylene) ethers, poly(2,6-dibromomethyl-1,4-phenylene) ethers, poly(2,6-diphenyl-1,4-phenylene) ethers, poly(2,6-ditolyl-1,4-phenylene) ethers, poly(2,6-dichloro-1,4-phenylene) ethers, poly(2,6-dibenzyl-1,4-phenylene) ethers and poly(2,5-dimethyl-1,4-phenylene) ethers, etc. Especially desirable PPE type resins are poly(2,6-dimethyl-1,4-phenylene) ethers. Furthermore, examples of polyphenylene ether copolymers that can be used include copolymers in which the abovementioned polyphenylene ether repeating units contain some amount of an alkyl-trisubstituted phenol such as 2,3,6-trimethylphenol. Furthermore, copolymers in which styrene type compounds are grafted to such polyphenylene ethers may also be used. Examples of polyphenylene ethers with grafted styrene type compounds include copolymers obtained by graft-polymerizing styrene type compounds such as styrene, α-methylstyrene, vinyltoluene or chlorostyrene, etc., to the abovementioned polyphenylene ethers.

Furthermore, inorganic anti-drip agents may also be used in combination with the abovementioned polytetrafluoroethylenes as anti-drip agents. Examples of inorganic anti-drip agents that can be used include silica, quartz, aluminum silicate, mica, alumina, aluminum hydroxide, calcium carbonate, talc, silicon carbide, silicon nitride, boron nitride, titanium oxide, iron oxide and carbon black, etc.

Other Components

Depending on the intended use, the flame-retardant resin composition of the present invention may also contain thermoplastic resins other than polycarbonates in amounts that cause no deterioration in the physical properties of the composition.

Examples of thermoplastic resins other than polycarbonates that can be used include styrene type resins, aromatic vinyl-diene-vinyl cyanide type copolymers, acrylic type resins, polyester type resins, polyolefin type resins, polyphenylene oxide type resins, polyester carbonate type resins, polyether imide type resins and methyl methacrylate/butadiene/styrene copolymers (MBS resins), etc. Two or more such resins may also be used in combination.

Examples of styrene type resins that can be used include polystyrene, poly-α-methylstyrene and styrene-acrylonitrile copolymers (SAN resins), etc.

Examples of aromatic vinyl-diene-vinyl cyanide type copolymers include styrene-butadiene-acrylonitrile copolymers (ABS resins), etc.

Examples of acrylic type resins include polymethyl methacrylates, etc.

Examples of polyester type resins include polyethylene terephthalates and polybutylene terephthalates, etc.

Examples of polyolefin type resins include polyethylenes, polypropylenes, polybutenes, polymethylpentenes, ethylene-propylene copolymers and ethylene-propylene-diene copolymers, etc.

Examples of polyphenylene oxide type resins include polyphenylene oxide resins; in the case of such resins, the hydrogen atoms bonded to the benzene nuclei may be substituted by alkyl groups or halogen atoms, etc.

It is desirable that such other thermoplastic resin components be added at the rate of 200 parts by weight or less, preferably 100 parts by weight or less, per 100 parts by weight of the abovementioned polycarbonate (A). In cases where these other thermoplastic resins are added in amounts exceeding 200 parts by weight, the characteristics of the polycarbonate type resin may deteriorate.

The flame-retardant resin composition of the present invention may also contain ultraviolet absorbing agents, hinder phenol type oxidation inhibitors, phosphorus type stabilizers and epoxy type stabilizers, etc.

Ultraviolet Absorbing Agents

Examples of ultraviolet absorbing agents that can be used include benzotriazole type ultraviolet absorbing agents, benzophenone type ultraviolet absorbing agents and salicylate type ultraviolet absorbing agents, etc.

Concrete examples of benzotriazole type ultraviolet absorbing agents include 2-(2'-hydroxy-5'-methylphenyl) benzotriazole, 2-(2'-hydroxy-5'-t-butylphenyl) benzotriazole, 2-(2'-hydroxy-5'-t-octylphenyl)benzotriazole, 2-(2'-hydroxy-3', 5'-di-t-butylphenyl) benzotriazole, 2-(2'-hydroxy-3',5'-di-amylphenyl)benzotriazole, 2-(2'-hydroxy-3'-dodecyl-5'-methylphenyl)benzotriazole, 2-(2'-hydroxy-3', 5'-dicumylphenyl)benzotriazole and 2,2'-methylenebis[4-(1,1,3,3-tetramethylbutyl)-6-(2H-benzotriazol-2-yl)phenol], etc. For example, such a benzotriazole type ultraviolet absorbing agent is commercially marketed by American Cyanamid Co. as UV5411. Furthermore, a benzophenone type ultraviolet absorbing agent is commercially marketed by American Cyanamid Co. as UV531. Moreover, examples of salicylate type ultraviolet absorbing agents that can be used include phenyl salicylate, p-t-butylphenyl salicylate and p-octylphenyl salicylate, etc.

Such ultraviolet absorbing agents are used at the rate of 0.01 to 10 parts by weight, and preferably 0.05 to 5 parts by weight, per 100 parts by weight of the abovementioned polycarbonate type resin.

Phosphorus Type Stabilizers

In regard to phosphorus type stabilizers, products that have been conventionally marketed as oxidation inhibitors can be used without any particular restrictions.

Concrete examples of stabilizers of this type that can be used include triphenyl phosphite, diphenylnonyl phosphite, tris-(2,4-di-t-butylphenyl) phosphite, trisnonylphenyl phosphite, diphenylisooctyl phosphite, 2,2'-methylenebis(4,6-di-t-butylphenyl)octyl phosphite, diphenylisodecyl phosphite, diphenylmono(tridecyl) phosphite, 2,2'-ethylidenebis(4,6-di-t-butylphenol) fluorophosphite, phenyldiisodecyl phosphite, phenyldi(tridecyl) phosphite, tris(2-ethylhexyl) phosphite, tris(isodecyl) phosphite, tris(tridecyl) phosphite, dibutyl hydrogenphosphite, trilauryl trithiophosphite, tetrakis(2,4-di-t-butylphenyl)-4,4'-biphenylene diphosphonite, 4,4'-isopropyli-denediphenol alkyl($C_{12}$~$C_{15}$)phosphites, 4,4'-butylidenebis(3-methyl-6-t-butylphenyhl)di-tridecyl phosphite, bis(2,4-di-t-butylphenyl)pentaerythritol diphosphite, bis(2,6-di-t-butyl-4-methylphenyl)pentaerythritol diphosphite, bis(nonylphenyl)pentaerythritol diphosphite, distearyl-pentaerythritol diphosphite, phenyl-bisphenol A pentaerythritol diphosphite, 1,1,3-tris(2-methyl-4-ditridecylphosphite-5-t-butylphenyl)butane and 3,4,5,6-tetrabenzo-1,2-oxaphosphane-2-oxide, etc. Partial hydrolysis products of these phosphites may also be used. Examples of commercially marketed phosphorus type stabilizers using the abovementioned compounds include Adekastab PEP-36, PEP-24, PEP-4C and PEP-8 (manufactured by Asahi Denka Kogyo K.K.), Irgafos 168 (trademark, manufactured by Ciba-Geigy Co.), Sandstab P-EPQ (trademark, manufactured by Sandoz Co.), Chelex L (trademark, manufactured by Sakai Kagaku Kogyo K.K.), 3P2S (trademark, manufactured by Ihara Chemical Kogyo K.K.), Mark 329K (trademark, manufactured by Asahi Denka Kogyo K.K.), Mark P (ditto) and Weston 618 (trademark, manufactured by Sanko Kagaku Kogyo K.K.), etc.

It is desirable that such phosphorus type stabilizers be used at the rate of 0.0001 to 1 part by weight, and preferably 0.001 to 0.5 parts by weight, per 100 polarizing beam splitter of the abovementioned polycarbonate type resin.

Hindered Phenol Type Oxidation Inhibitors

Concrete examples of hindered phenol type oxidation inhibitors that can be used include n-octadecyl-3-(3',5'-di-t-butyl4-hydroxyphenyl) propionate, 2,6-di-t-butyl-4-hydroxymethylphenol, 2,2'-methylenebis(4-methyl-6-t-butylphenol) and pentaerythritol-tetrakis[3-(3',5'-di-t-butyl-4-hydroxyphenyl) propionate], etc. These compounds may be used singly or in combinations consisting of two or more compounds.

It is desirable that such hindered phenol type stabilizers be used at the rate of 0.0001 to 1 part by weight, and preferably 0.001 to 0.5 parts by weight, per 100 parts by weight of the abovementioned polycarbonate type resin.

Epoxy Type Stabilizers

Examples of epoxy type stabilizers that can be used include epoxidated soybean oil, epoxidated linseed oil, phenylglycidyl ether, allylglycidyl ether, t-butylphenylglycidyl ether, 3,4-epoxycyclohexylmethyl-3',4'-epoxycyclohexyl carboxylate, 3,4-epoxy-6-methylcyclohexylmethyl-3',4'-epoxy-6'-methylcyclohexyl carboxylate, 2,3-epoxycyclohexylmethyl-3',4'-epoxycyclohexyl carboxylate, 4-(3,4-epoxy-5-methylcyclohexyl)butyl-3',4'-epoxycyclohexyl carboxylate, 3,4-epxoxycyclohexylethylene oxide, cyclohexylmethyl-3,4-epoxycyclohexyl carboxylate, 3,4-epoxy-6-methylcyclohexylmethyl-6'-methylcyclohexyl carboxylate, bisphenol A diglycidyl ether, tetrabromobisphenol A glycidyl ether, phthalic acid diglycidyl ester, hexahydrophthalic acid diglycidyl ester, bis-epoxydicyclopentadienyl ether, bis-epoxyethylene glycol, bis-epoxycyclohexyl adipate, butadiene diepoxide, tetraphenylethylene epoxide, octyl epoxyphthalate, epoxidated polybutadienes, 3,4-dimethyl-1,2-epoxycyclohexane, 3,5-dimethyl-1,2-epoxycyclohexane, 3-methyl-5-t-butyl-1,2-epoxycyclohexane, octadecyl-2,2-dimethyl-3,4-epoxycyclohexyl carboxylate, N-butyl-2,2-dimethyl-3,4-epoxycyclohexyl carboxylate, cyclohexyl-2-methyl-3,4-epoxycyclohexyl carboxylate, N-butyl-2-isopropyl-3,4-epoxy-5-methylcyclohexyl carboxylate, octadecyl-3,4-epoxycyclohexyl carboxylate, 2-ethylhexyl-3',4'-epoxycyclohexyl carboxylate, 4,6-dimethyl-2,3-epoxycyclohexyl-3',4'-epoxycyclohexyl carboxylate, 4,5-epoxytetrahydrophthalic anhydride, diethyl-4,5-epoxy-cis-1,2-cyclohexyl dicarboxylate and di-n-butyl-3-t-butyl-4,5-epoxy-cis-1,2-cyclohexyl dicarboxylate, etc.

It is desirable that such epoxy type stabilizers be added at the rate of 0.0001 to 5 parts by weight, preferably 0.001 to 1 part by weight, and even more preferably 0.005 to 0.5 parts by weight, per 100 parts by weight of the abovementioned polycarbonate type resin.

Furthermore, thiol type and metal salt type stabilizers, etc., may also be used.

Mold Release Agents

Examples of mold release agents that can be used include silicone type mold release agents such as methylphenyl silicone oils, etc., ester type mold release agents such as pentaerythritol tetrastearate, glycerol monostearate and montan wax, etc., and olefin type mold release agents such as poly-α-olefins, etc. It is desirable that such mold release agents be added at the rate of 0.01 to 10 parts by weight, preferably 0.05 to 5 parts by weight, and even more preferably 0.1 to 1 part by weight, per 100 parts by weight of the abovementioned polycarbonate type resin.

Depending on the intended use of the composition, universally known additives such as coloring agents (dyes or pigments such as carbon black or titanium oxide, etc.), fillers, reinforcing agents (glass fibers, carbon fibers, talc, clay, mica, glass flakes, mild glass or glass beads), slip agents, plasticizers, flame-retarding agents and fluidity-enhancing agents, etc., may also be added to the flame-retardant resin composition of the present invention as long as such addition causes no loss of the physical properties of the composition.

There are no particular restrictions on the method used to manufacture the flame-retardant resin composition of the present invention; universally known methods can be used. In particular, melt mixing methods are especially desirable. Small amounts of solvents may also be added during the manufacture of the resin composition.

Examples of manufacturing apparatus that can be used include extruders, Banbury mixers, rollers and kneaders, etc. These devices may be operated continuously or in a batch type operation. In this case, there are no particular restrictions on the order in which the components are mixed.

As was described above, the flame-retardant resin composition of the present invention is superior in terms of flame-retarding properties, and shows no dripping during combustion.

For example, when a test sample of the flame-retardant resin composition of the present invention with a thickness of 1/16 inch was prepared in accordance with the test method indicated in Bulletin 94 "Combustion Tests for Classification of Materials" published by Underwriters Laboratory Incorporated (hereafter referred to as UL-94), and this sample was evaluated using the evaluation criteria of UL-94 V, the composition was graded as UL-94 V-0. Furthermore, in regard to UL-94, the respective V grade criteria may be summarized as shown below.

V-0: A flame is caused to contact a single sample twice. The total flame maintenance time for 5 samples following flame contact (10 flame contacts) is 50 seconds or less, and the flame maintenance time in the case of a single flame contact is 10 seconds or less. Furthermore, none of the samples shows any dripping that ignites degreased cotton.

V-1: The total flame maintenance time for 5 samples following flame contact (10 flame contacts) is 250 seconds or less, and the flame maintenance time in the case of a single flame contact is 30 seconds or less. Furthermore, none of the samples shows any dripping that ignites degreased cotton.

V-2: The total flame maintenance time for 5 samples following flame contact (10 flame contacts) is 250 seconds or less, and the flame maintenance time in the case of a single flame contact is 30 seconds or less. Furthermore, all of the samples show dripping that ignites degreased cotton.

The flame-retardant resin composition of the present invention can be molded into any desired shape using any desired molding method such as injection molding, extrusion molding or blow molding, etc.

The molded articles thus obtained have a superior impact resistance and a high heat resistance, and are also superior in terms of flame-retarding properties. Accordingly, molded articles consisting of the resin composition of the present invention are ideal for use in outer panels of OA equipment and household electrical appliances, housing materials and parts for electrical and electronic equipment.

The flame-retardant resin composition of the present invention has superior flame-retarding properties without sacrificing impact resistance or moldability. Furthermore, the composition of the present invention contains no flame-retarding agents consisting of chlorine or bromine compounds, etc.; accordingly, there is no danger that gases containing halogens originating in flame-retarding agents will be generated during combustion. Thus, the flame-retardant resin composition of the present invention also shows superior performance from the standpoint of protection of the environment.

Accordingly, such a flame-retardant resin composition can be used in applications where superior flame-retarding properties are required, e. g., in housing materials and parts of household electrical appliances and OA equipment such as television sets, monitors, printers, copying machines and personal computers, etc., and in battery packs, liquid crystal reflective panels, automotive materials and construction materials, etc. Thus, the flame-retardant resin composition of the present invention is extremely useful.

WORKING EXAMPLES

The present invention will be describe in greater detail below in terms of working examples; however, the present invention is not limited in any way by these working examples.

Furthermore, unless otherwise indicated, all parts in the working examples are parts by weight, and all percentages indicate wt %.

Furthermore, the following compounds were used as the respective components:

(1) Polycarbonate Type Resin (PC)

Bisphenol A polycarbonate: LEXAN (commercial name, manufactured by Nippon GE Plastics K.K.), intrinsic viscosity at 25° C. measured in methylene chloride: 0.42 dl/g, viscosity average molecular weight (Mv)=18,000 (calculated value).

(2) Polytetrafluoroethylene (PTFE)

Polyflon D-2C (commercial name, manufactured by Daikin Kagaku Kogyo K.K.). Prepared by emulsifying and dispersing PTFE in water; PTFE content 60%. Furthermore, since this Polyflon D-2C is added at the rate of 0.82% relative to the polycarbonate type resin, the actual amount of PTFE added is 0.49%. Moreover, the water is volatilized during the preparation of the resin composition.

(3) Silicone Resin

The silicone resins used were synthesized as described below

Example of Preparation 1

1764 parts of toluene and 1050 parts of ion-exchanged water were placed in a flask equipped with an agitator, a heating jacket, a reflux condenser and a dropping funnel, and this mixture was agitated. 990.3 parts (4.5 moles) of methyltriisopropoxysilane and 634.8 parts (3 moles) of phenyltrichlorosilane were mixed, and this mixture was added to the flask dropwise over a period of 45 minutes using the aforementioned dropping funnel, so that the silane compounds in the flask were hydrolyzed. Agitation was stopped 60 minutes after the completion of this dropwise addition, and the organic layer was extracted from the reaction solution (which separated into two layers). This organic layer was washed with water so that the hydrochloric acid component was removed; afterward, the organic layer was placed under a reduced pressure and the moisture in the organic layer was removed, thus producing a toluene solution of a silanol-group-containing silicone resin with a molecular weight of 2500 (P-1).

Next, 57 parts (0.52 moles) of trimethylchlorosilane and 95 parts (0.589 moles) of hexamethyldisilazane were added to 600 parts of the silicone resin toluene solution (P-1) thus obtained (calculated in terms of the silicone resin content), and this mixture was heated and agitated at a temperature of 70 to 80° C. After 2 hours of heating and agitation, it was confirmed by IR that the absorption of OH groups (3200 cm$^{-1}$) had decreased. Next, the ammonia, hydrochloric acid and salts of the same produced by the reaction were removed by washing with water, and the aqueous layer was separated and removed. Afterward, moisture was removed from the toluene layer under reduced pressure. Next, the salts that could not be sufficiently removed by washing with water were filtered out using a filtration assistant, and the toluene was then removed, producing a trimethylsilylated silicone resin (A-1) with a molecular weight of 3400. Furthermore, the weight average molecular weight of this silicone resin (A-1) was measured by GPC (HLC-802U manufactured by Toyo Soda K.K.), and the presence or absence of OH groups was confirmed by IR measurements using Lambert's rule.

Examples of Preparation 2~5

Silicone resins (A-2) through (A-5) were synthesized in the same manner as in the abovementioned Example of Preparation 1, except that the amounts of toluene, ion-exchanged water, methyltriisopropoxysilane, trimethylchlorosilane and hexamethyldisilazane used were as shown in Table 1. The characteristics of the silicone resins thus obtained are shown in Table 1.

Example of Preparation 6

1350 parts of toluene and 1050 parts of ion-exchanged water were placed in a flask equipped with an agitator, a heating jacket, a reflux condenser and a dropping funnel, and this mixture was agitated. 950.4 parts (4.32 moles) of methyltriisopropoxysilane, 304.7 parts (1.44 moles) of phenyltrichlorosilane and 364.6 parts (1.44 moles) of diphenyldichlorosilane were mixed in the dropping funnel, and this mixture was added to the flask dropwise over a period of 45 minutes, so that the silane compounds were hydrolyzed. Following the completion of this dropwise addition, the mixture was heated and agitated for 2 hours at the reflux temperature of toluene. Following cooling, the agitation was stopped. Then, the organic layer was extracted from the reaction solution (which separated into two layers). This organic layer (toluene layer) was washed with water so that the hydrochloric acid component was removed; afterward, the organic layer was placed under a reduced pressure and the moisture in the organic layer was removed, thus producing a toluene solution of a silanol-group-containing silicone resin with a molecular weight of 18,000. Next, 57 parts (0.52 moles) of trimethylchlorosilane and 95 parts (0.589 moles) of hexamethyldisilazane were added to 770 parts of the silicone resin toluene solution (P-1) thus obtained (calculated in terms of the silicone resin content), and this mixture was heated and agitated at a temperature of 70 to 80° C. After 2 hours of heating and agitation, it was confirmed by IR that the absorption of OH groups (3200 $cm^{-1}$) had decreased. Next, the ammonia, hydrochloric acid and salts of the same produced by the reaction were removed by washing with water, and the aqueous layer was separated. Afterward, moisture was removed under reduced pressure. Next, the salts that could not be sufficiently removed by washing with water were filtered out using a filtration assistant, and the toluene was then removed, producing a trimethylsilylated silicone resin (B-1) with a molecular weight of 20,000.

The characteristics of the silicone resin (B-1) thus obtained are shown in Table 1.

Example of Preparation 7

A silicone resin (B-2) was synthesized in the same manner as in the abovementioned Example of Preparation 6, except that the amounts of toluene, ion-exchanged water, methyltriisopropoxysilane, trimethylchlorosilane, hexamethyldisilazane and diphenyldichlorosilane used were as shown in Table 1.

The characteristics of the silicone resin thus obtained are shown in Table 1.

Example of Preparation 8

1350 parts of toluene and 1600 parts of ion-exchanged water were placed in a flask equipped with an agitator, a heating jacket, a reflux condenser and a dropping funnel, and this mixture was agitated. 554.4 parts (2.52 moles) of methyltriisopropoxysilane, 685.6 parts (3.24 moles) of phenyltrichlorosilane and 364.6 parts (1.44 moles) of diphenyldichlorosilane were mixed in the dropping funnel, and this mixture was added to the flask dropwise over a period of 45 minutes, so that the silane compounds were hydrolyzed. Following the completion of this dropwise addition, the mixture was heated and agitated for 10 hours at the reflux temperature of toluene. Following cooling, the agitation was stopped. Then, following liquid-liquid separation, the organic layer was washed with water so that the hydrochloric acid component was removed; afterward, the organic layer was placed under a reduced pressure and the solvent was removed. Then, the moisture was removed from the organic layer, thus producing a toluene solution of a silanol-group-containing siloxane resin with a molecular weight of 74,000. Next, 57 parts (0.52 moles) of trimethylchlorosilane and 95 parts (0.589 moles) of hexamethyldisilazane were added to 770 parts of the siloxane resin toluene solution thus obtained (calculated in terms of the resin content), and this mixture was heated and agitated. After 2 hours of heating and agitation at a temperature of 70 to 80° C., it was confirmed by IR that the absorption of OH groups (3200 $cm^{-1}$) had decreased. Next, the ammonia, hydrochloric acid and salts of the same produced by the reaction were removed by washing with water, and the aqueous layer was separated. Afterward, moisture was removed under reduced pressure. Next, the salts that could not be sufficiently removed by washing with water were filtered out using a filtration assistant, and the toluene was then removed. Then, after it was confirmed by IR that the absorption of OH groups (3200 $cm^{-1}$) had decreased, the ammonia, hydrochloric acid and salts of the same produced by the reaction were removed by washing with water, and the aqueous layer was separated. Afterward, moisture was removed under reduced pressure. Then, the reaction product was filtered using a filtration assistant, and the toluene was removed, thus producing a trimethylsilylated silicone resin (B-3) with a molecular weight of 75,000.

The characteristics of the silicone resin thus obtained are shown in Table 1.

TABLE 1

| Silicone resin | A-1 | A-2 | A-3 | A-4 | A-5 | B-1 | B-2 | B-3 |
|---|---|---|---|---|---|---|---|---|
| Amounts of raw materials used (parts) | | | | | | | | |
| Toluene | 1764 | 1500 | 1904 | 1195.5 | 1350 | 1350 | 1350 | 1350 |
| Ion-exchanged water | 1050 | 2000 | 2028 | 2363.7 | 1700 | 1600 | 1600 | 1600 |
| Phenyltrichlorosilane | 634.8 | 990.3 | 1007.3 | 825 | 1036 | 304.7 | 685.6 | 685.6 |
| Methyltriisopropoxysilane | 990.3 | 554.4 | 261.8 | 462 | 462 | 950.4 | 554.4 | 554.4 |
| Trimethylchlorosilane | 57 | 57 | 57 | 57 | 57 | 57 | 57 | 57 |
| Hexamethyldisilazane | 95 | 95 | −95 | 95 | 95 | 95 | 95 | 95 |
| Diphenyldichlorosilane | — | — | — | — | — | 364.5 | 364.5 | 364.5 |
| Characteristics | | | | | | | | |
| Constituent units | T and M | T and M | T and M | T and M | T and M | T.D.M | T.D.M | T.D.M |
| Ph/Me molar ratio | 40/60 | 65/35 | 80/20 | 65/35 | 70/30 | 50/50 | 70/30 | 70/30 |

TABLE 1-continued

| Silicone resin | A-1 | A-2 | A-3 | A-4 | A-5 | B-1 | B-2 | B-3 |
|---|---|---|---|---|---|---|---|---|
| Weight average molecular weight | 3400 | 4200 | 4500 | 7800 | 7500 | 20000 | 15000 | 75000 |
| Softening point (° C.) | 75 | 75 | 125 | 160 | 140 | 20 | 30 | 85 |
| OH residues | 0 | 0 | 0 | 0 | 0 | 0 | 0 | 0 |

Ph/Me molar ratio: Ratio (molar ratio) of phenyl groups to methyl groups in silicone units other than M units (i. e., T units, D units).

Working Example 1

100 parts by weight of a polycarbonate, 2 parts by weight of silicone resin (A-1), 0.49 parts by weight of PTFE and 0.045 parts by weight of a phosphorus type stabilizer tris (2,4-di-t-butylphenyl) phosphite (commercial name: Irgafos 168, manufactured by Ciba-Geigy Co.) were mixed, and this mixture was extruded by means of a two-shaft extruder at a screw rotational speed of 270 rpm and a barrel temperature of 280° C. Pellets were then formed by cutting the extruded mixture to a specified length. Using these pellets, test samples (125×13×1.6 mm) were injection-molded by means of a 100 t injection molding machine at a barrel temperature of 280° C. and a mold temperature of 80° C. The molded samples thus obtained were subject to a test of flame-retarding properties.

The test of flame-retarding properties was performed in accordance with UL-94. Specifically, testing was performed in accordance with the test method described in Bulletin 94 "Combustion Tests for Classification of Materials" published by Underwriters Laboratory Incorporated (hereafter referred to as UL-94).

In concrete terms, the vertically held sample was caused to contact the flame of a burner for 10 seconds, and the flame maintenance time was measured. This flame contact was performed for 5 samples with flame contact being effected twice for each sample; the total flame maintenance time for 10 flame contacts and the flame maintenance time for a single flame contact were evaluated, and the dripping of fire-generating particles (or lack thereof) was also evaluated. On the basis of these evaluations, the samples were graded as shown below. In the present working example, an evaluation was made as to whether or not the sample passed with a grade of V-0.

V-0: The total flame maintenance time for 5 samples following flame contact (10 flame contacts) is 50 seconds or less, and the flame maintenance time in the case of a single flame contact is 10 seconds or less. Furthermore, none of the samples shows any dripping that ignites degreased cotton.

V-1: The total flame maintenance time for 5 samples following flame contact (10 flame contacts) is 250 seconds or less, and the flame maintenance time in the case of a single flame contact is 30 seconds or less. Furthermore, none of the samples shows any dripping that ignites degreased cotton.

V-2: The total flame maintenance time for 5 samples following flame contact (10 flame contacts) is 250 seconds or less, and the flame maintenance time in the case of a single flame contact is 30 seconds or less. Furthermore, all of the samples show dripping that ignites degreased cotton.

Working Examples 2~5

Pellets were manufactured in the same manner as in Working Example 1, except that silicone resins (A-2) through (A-5) were used instead of the aforementioned silicone resin (A-1) used in Working Example 1. These pellets were then tested for flame-retarding properties.

The results obtained are shown in Table 2

Comparative Examples 1~7

Pellets were manufactured in the same manner as in Working Example 1, except that the compositions shown in Table 2 were used. These pellets were then tested for flame-retarding properties. Furthermore, a phosphorus type stabilizer tris(2,4-di-t-butylphenyl) phosphite (commercial name: Irgafos 168, manufactured by Ciba-Geigy Co.) was similarly added at the rate of 0.045 parts by weight per 100 parts by weight of polycarbonate.

The results obtained are shown in Table 2.

As is shown in Table 2, the resin composition of the present invention has a short combustion time, since both an anti-dripping agent and a silicone resin consisting of T units and M units are added to the polycarbonate type resin of the composition. Furthermore, dripping is suppressed, and the composition has superior flame-retarding properties (UL94 V-0).

TABLE 2

| | | Working Example 1 | Working Example 2 | Working Example 3 | Working Example 4 | Working Example 5 | Comparative Example 1 | Comparative Example 2 |
|---|---|---|---|---|---|---|---|---|
| Composition (parts) | | 100 | 100 | 100 | 100 | 100 | 100 | 100 |
| | Silicone resin (A-1) | 2 | | | | | | |
| | Silicone resin (A-2) | | 2 | | | | | |
| | Silicone resin (A-3) | | | 2 | | | | |
| | Silicone resin (A-4) | | | | 2 | | | |
| | Silicone resin (A-5) | | | | | 2 | | |
| | Silicone resin (B-1) | | | | | | 2 | |
| | Silicone resin (B-2) | | | | | | | 2 |
| | Silicone resin (B-3) | | | | | | | |
| | PTFE[1] | 0.49 | 0.49 | 0.49 | 0.49 | 0.49 | 0.49 | 0.49 |

TABLE 2-continued

| Test of flame-retarding properties | Total combustion time (seconds)[2] | 32 | 17 | 20 | 20 | 21 | 101 | 65 |
|---|---|---|---|---|---|---|---|---|
| | Number of dripping samples[3] | 0 | 0 | 0 | 0 | 0 | 0 | 0 |
| | UL94 V-0 pass/fail UL94 V-O | Pass | Pass | Pass | Pass | Pass | Pass | Fail |

| | | Comparative Example 3 | Comparative Example 4 | Comparative Example 5 | Comparative Example 6 | Comparative Example 7 |
|---|---|---|---|---|---|---|
| Composition (parts) | Silicone resin (A-1) | 100 | 100 | 100 | 100 | 100 |
| | Silicone resin (A-2) | | 2 | | | |
| | Silicone resin (A-3) | | | 2 | | |
| | Silicone resin (A-4) | | | | 2 | |
| | Silicone resin (A-5) | | | | | |
| | Silicone resin (B-1) | | | | | |
| | Silicone resin (B-2) | | | | | |
| | Silicone resin (B-3) | 2 | | | | |
| | PTFE[1] | 0.49 | | | | 0.49 |
| Test of flame-retarding properties | Total combustion time (seconds)[2] | 73 | 173 | 155 | 134 | 71 |
| | Number of dripping samples[3] | 0 | 5 | 5 | 5 | 1 |
| | UL94 V-0 pass/fail UL94 V-O | Fail | Fail | Fail | Fail | Fail |

[1] PTFE refers to the amount of PTFE excluding water, etc.
[2] The total combustion time is the total of the average flame maintenance times for 5 samples.
[3] The number of dripping samples is the number of samples among the 5 samples tested that showed ignition of degreased cotton caused by dripping.

What is claimed is:

1. A flame-retardant resin composition wherein said composition contains
(A) a polycarbonate resin,
(B) a silicone resin constructed from siloxane units expressed by the formula $RSiO_{1.5}$ (T units) and siloxane units expressed by the formula $R_3SiO_{0.5}$ (M units), or a silicone resin constructed from T units, M units and siloxane units expressed by the formula $SiO_{2.0}$ (Q units) (R indicates an unsubstituted or substituted monovalent hydrocarbon group with 1 to 10 carbon atoms),

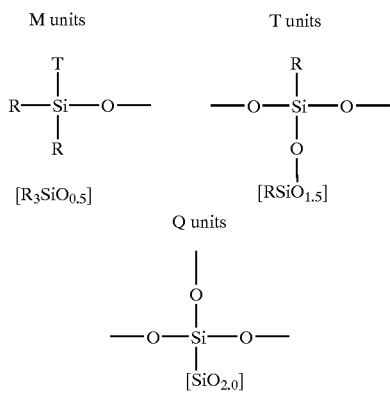

and
(C) an anti-drip agent, and the aforementioned composition contains 0.1 to 9 parts by weight of the abovementioned silicone resin (B), and 0.01 to 10 parts by weight of the abovementioned anti-drip agent, per 100 parts by weight of the abovementioned polycarbonate resin (A).

2. The flame-retardant resin composition claimed in claim 1, wherein the aforementioned anti-drip agent is a polytetrafluoroethylene (PTFE).

3. The flame-retardant resin composition claimed in claim 2, wherein said composition contains the aforementioned polytetrafluoroethylene in an amount of 0.01 to 2 parts by weight per 100 parts by weight of the aforementioned polycarbonate type resin (A).

4. An article comprising the resin composition of claim 1.
5. An article comprising the resin composition of claim 2.
6. An article comprising the resin composition of claim 3.

7. A method for making a flame-retardant resin composition, which method comprises the step of melt-blending: (A) a polycarbonate resin with (B) a silicone resin constructed from siloxane units expressed by the formula $RSiO_{1.5}$ (T units) and siloxane units expressed by the formula $R_3SiO_{1.5}$ (M units), or a silicone resin constructed from T units, M units and siloxane units expressed by the formula $SiO_{2.0}$ (Q units) (R indicates an unsubstituted or substituted monovalent hydrocarbon group with 1 to 10 carbon atoms),

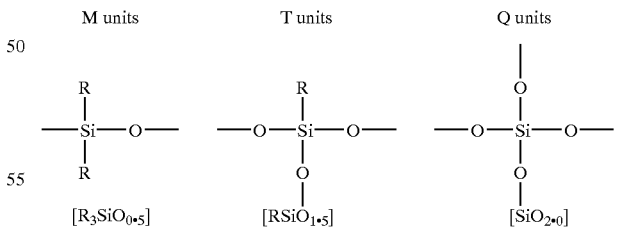

and
C) an anti-drip agent, and the aforementioned composition contains 0.1 to 9 parts by weight of the abovementioned silicone resin (B), and 0.01 to 10 parts by weight of the abovementioned anti-drip agent, per 100 parts by weight of the abovementioned polycarbonate resin (A).

* * * * *